United States Patent [19]
Waldron, III et al.

[11] Patent Number: 6,021,425
[45] Date of Patent: *Feb. 1, 2000

[54] SYSTEM AND METHOD FOR OPTIMIZING DISPATCH LATENCY OF TASKS IN A DATA PROCESSING SYSTEM

[75] Inventors: Theodore C. Waldron, III, Sunrise; Paul P. Giangarra, Boca Raton; Khoa D. Huynh, Miami; John G. Tyler, Boynton Beach; Scott L. Winters, Plantation, all of Fla.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 07/862,888

[22] Filed: Apr. 3, 1992

[51] Int. Cl.[7] .......................................................... G06F 9/44

[52] U.S. Cl. .......................................... 709/103; 709/107

[58] Field of Search ............................ 395/650; 709/103, 709/107, 108

[56] References Cited

U.S. PATENT DOCUMENTS

| | | |
|---|---|---|
| 4,736,318 | 4/1988 | Delyani et al. . |
| 4,908,750 | 3/1990 | Jablow . |
| 4,918,595 | 4/1990 | Kahn et al. . |
| 5,630,128 | 5/1997 | Farrell et al. ............................ 709/103 |

OTHER PUBLICATIONS

An Introduction to Operating Systems, H.M. Dieter, Addison–Wesley Publishing Co., Feb. 1990, pp. 782–827.

"Executing A Preemptive, Priority–Based Dispatcher In A Multitasking Environment", IBM Technical Disclosure Bulletin, vol. 30, No. 4, New York, U.S., Sep., 1987, p. 1542.

"Realtime Task Dispatcher For Multiloop Control Systems", IBM Technical Disclosure Bulletin, vol. 31, No. 6, New York, U.S., Nov., 1988, pp. 446–453.

"Reducing Interrupt Latency In Multi–Tasking Operating Systems Running On PC And PC Compatibles/Clones", IBM Technical Disclosure Bulletin, vol. 34, No. 4A, New York, U.S., Sep., 1991, pp. 454–455.

*Primary Examiner*—Dennis M. Butler
*Attorney, Agent, or Firm*—Jeffrey S. LaBaw; Andrew J. Dillon

[57] ABSTRACT

The invention provides a system and method of enhancing efficiency in a data processing system having a processor, a memory, and a multitasking operating system for managing the processor and the memory. A normal and an expedited scheduling path are provided for scheduling tasks on the processor. The tasks are each assigned a priority for execution on the processor. A queue is provided for the placement of tasks ready for execution. Upon entry into the ready-to-run queue, the execution priority of the new task is compared to the execution priority of the executing task. Responsive to the new task holding a higher execution priority or to absence of an executing task, the expedited scheduling path is invoked. Otherwise the normal scheduling path is invoked.

8 Claims, 4 Drawing Sheets

SYSTEM AND METHOD FOR OPTIMIZING DISPATCH LATENCY OF TASKS IN A DATA PROCESSING SYSTEM

BACKGROUND OF THE INVENTION

1. Technical Field

The present invention relates to scheduling of jobs on a computer central processing unit in a multitasking operating environment, and more particularly relates to reducing the time to dispatch of a job having a higher priority for execution than a currently executing job upon a change in status of the higher priority job to "ready-to-run". Still more particularly, the present invention relates to making the time to dispatch of jobs having a time critical priority status both optimal and predictable.

2. Description of the Related Art

First generation personal computer systems handled tasks on a strictly serial basis. In such systems the first task to arrive was the first executed. Early on it was observed that most tasks were characterized by alternating cycles of execution on the computer central processing unit and input/output device waits. Computer system input/output ("I/O") devices are devices such as disk drive units for data storage, keyboards for user inputs, printers and video monitors for display of results. CPU's periodically reach points where, to continue execution of a task, it is necessary to recover data from a disk drive unit or to prompt a user to enter instructions. The period during which such data is waited on is an I/O wait and during this period execution of the task is blocked.

The central processing unit ("CPU") of a computer is its fundamental working element. The CPU interprets and executes instructions. During periods of an I/O wait, the CPU in an early generation personal computer lies idle. Placing other tasks onto the CPU during an I/O wait thus can improve system throughput.

An active task on a computer periodically changes states. A task is ready to run if ready for execution on the CPU. A task has the state of being blocked if, for example, the CPU must wait for an I/O operation to be completed. A task assumes the state of running when memory has been reversed for the task and the task has been dispatched to the CPU. Knowledge of the process states can be utilized to schedule tasks to a CPU allowing the CPU to switch from task to task to improve throughput.

Once scheduling of the CPU becomes available, multi-programmed operating systems become a possibility. Multiprogramming, sometimes called multitasking, allows utilization of a computer's ("CPU") during what were idle periods in earlier generation computers. In multitasking, the central processing unit is switched between tasks. In its most basic form, several processes are kept in computer memory awaiting access to the central processing unit. When an executing process reaches a point where it requires completion of an I/O device request, the central processing unit is taken away from the executing process, and another waiting process from memory takes its place. In more sophisticated operating systems, a process is not necessarily permitted to hold the microprocessor until it reaches its waiting or blocked state. Numerous criteria may be used to determine when a process is to be removed (interrupted) from the CPU. Other criteria are considered in determining which process to dispatch to the CPU. The benefits of multitasking are that it almost always increases computer system throughput.

Although all computer system resources may be scheduled, scheduling of the CPU is the essential feature of any multitasking operating system. The tasks being scheduled for execution are referred to as concurrently executing processes. The goal of scheduling is to have some task in execution on the CPU at all times.

In the OS/2 operating system available from International Business Machines Corporation, scheduling is a preemptive, general priority system. Tasks are assigned a priority for execution. When tasks are "ready to run", the task having the highest priority generally is executed before any other task. When tasks are of the same priority level for execution, a queue is established for the priority level and execution is alternated on a time-out basis between ready to run tasks in the queue. This is referred to round-robin scheduling.

Among many applications, multitasking has been used to improve the presentation of data to users. For example, an application program such as a game may be loaded onto a computer as one or more processes. The game may use a second program, such as Presentation Manager, available from International Business Machines Corporation, to generate a graphic user interface for presentation of the game to the user. Tasks relating to update of the display will be given a time-critical priority classification to give the user the feel of instantaneous responsiveness. Scorekeeping in such a game may be assigned to regular or to fixed-high priority classes. Of particular importance to the present invention is the treatment of time critical threads, particularly to support real-time applications such as multimedia and process control software.

Prior art data processing systems are known to the art providing user or application selection of schedulers, however, such schedulers are not of automatic and general applicability and frequently require user modification of either the operating system, the application program, or both, to be utilized.

SUMMARY OF THE INVENTION

One object of the present invention is to provide a method and system for scheduling of jobs on a computer central processing unit in a multitasking operating environment.

Another object of the invention is to provide for reducing the time to dispatch of a job having a higher priority for execution than a currently executing job upon a change in status of the higher priority job to "ready-to-run".

Still another object of the invention is to provide a system and method for making the time to dispatch of jobs having a time critical priority status both optimal and predictable.

The foregoing objects are achieved as is now described. The invention provides a system and method of enhancing efficiency in a data processing system having a processor, a memory, a plurality of input/output devices and a multitasking operating system for managing the processor and the memory. A normal and an expedited scheduling path are provided for scheduling jobs on the processor. The jobs are each assigned a priority for execution on the processor. A queue is provided for the placement of jobs ready for execution. Periodically, a job holding a highest execution priority from among jobs in the queue is selected. If a process is executing on the processor, the execution priority of the selected job is compared to the execution priority of the executing job. Responsive to the selected job holding a higher execution priority or to absence of an executing job, the expedited scheduling path is invoked. Otherwise the normal scheduling path is invoked.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
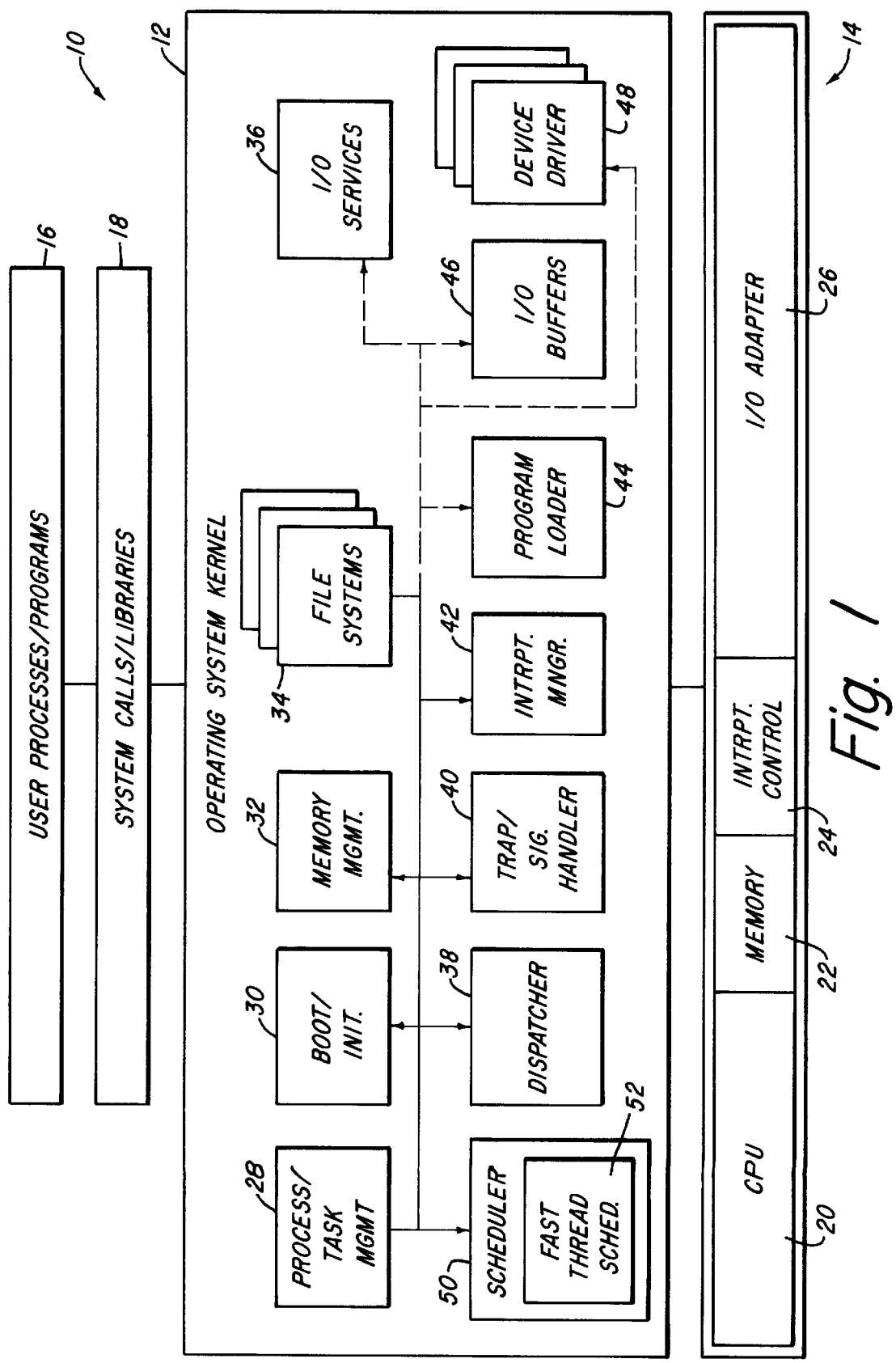
FIG. 1 is a high level block diagram software and hardware components of a data processing system which may be utilized to implement the method and system of the present invention.

With reference now to the figures and in particular with reference to FIG. 1, there is depicted a high level block diagram illustrating software and hardware components of a multitasking data processing system 10 which may be utilized to implement the method and system of the present invention. Data processing system 10 includes an operating system kernel 12 which resides in a hardware system 14. The operating system is preferably provided by a disk operating system such as the OS/2® operating system available from International Business Machines Corporation. Hardware system 14 includes at a minimum a central processing unit (CPU) 20 and a computer memory 22. Hardware system 14 further preferably includes an interrupt controller 24 and input/output adapters 26.

Also depicted in FIG. 1 are user processes/programs 16 which, in a manner well known to those skilled in the art, access selected procedures within operating system kernel 12 by means of system calls which are depicted at reference numeral 18. As is typical in such systems selected procedures within operating system kernel 12 are designed to be called or invoked by applications within data processing system 10 and thereafter the task will return to the user program which invoked the operating system kernel procedure. In this manner, operating system kernel 12 acts as an interface between the user of data processing system 10 and hardware system 14.

Operating system kernel 12 is utilized to provide an environment in which various processes or programs may be executed. Operating system kernel 12 provides for the efficient utilization and prevents user application programs from interfering with the proper operation of data processing system 10 by controlling the creation and alteration of files, the control of input/output devices and the provision of multiple device drivers which permits data processing system 10 to interface with various external devices.

Still referring to FIG. 1, it may be seen that operating system kernel 12 includes multiple subsystems, including process/task management system 28 which is utilized to provide task creation, deletion, status and synchronization functions for each thread. Boot/initialization system 30 typically is embodied in microcode in non-addressable memory and is utilized to load the operating system into computer memory 22.

Next, memory management system 34 is depicted. Memory management system 32 allocates and deallocates portions of computer memory 22 for data processing system 10. File systems 34 are preferably utilized to control the creation and deletion of files. A file is simply a named set of records stored or processed as a unit by a data processing system. Another aspect of files typically addressed within an operating system kernel is control of access to the files. Access control is utilized to ensure that an access to a file or directory is checked for correctness. Next, input/output services system 36 is depicted. Input/output services system 36 is preferably a functional unit within operating system kernel 12 which controls peripheral hardware.

Next, dispatcher 38 is depicted within operating system kernel 12. Dispatcher 38 places jobs or tasks into execution. Dispatcher 38 is thus responsible for providing multi-tasking and operates in conjunction with a scheduler to implement a particular type of scheduling system.

Trap and signal handler 40 is also depicted within operating system kernel 12 and is utilized to respond to traps and signals typically activated by hardware system 14. Among the signals generated by hardware 14 are page fault signals indicated operations relating to computer memory 22 and auxiliary memory accessed through I/O adapters 26. Such page fault signals are subdivided into two categories corresponding to the type of memory being accessed. Page reclaim operations relate to a memory paging operation limited to computer memory 22. A page fault requiring I/O operations is the second category. Any auxiliary memory operation requires a relatively large amount of time to execute compared to central processor operation and page reclaims.

Interrupt manager 42 preferably manages interrupt handlers which are set up by the operating system kernel 12 and kernel extensions to take whatever action is necessary to respond to the occurrence of an interrupt. Program loader system 44 is also depicted within operating system kernel 12 and, as those skilled in the art will now appreciate, is typically a routine which loads programs, libraries and kernel extensions. A process is created upon loading of a program into computer memory 22. All processes are initially created with one thread. However, a thread can create other threads, either for its own process or for another, potentially new process.

Input/output buffers 46 are depicted within operating system kernel 12 are utilized to temporarily store data during transfer from one hardware device to another in order to compensate for possible differences in data flow rate.

A plurality of device drivers 48 are depicted. Device drivers 48 are typically utilized to attach and use various input/output devices which may be coupled to data processing system 10. For example, displays, keyboards, printers, floppy disk drives, fixed disk drives and other input/output devices are typically controlled from data processing system 10 utilizing a device driver associated with the particular input/output device selected for control. Device drivers 48 may be installed or removed into operating system kernel 12 as required.

Next, scheduler 50 is depicted. Scheduler 50 orders specific tasks for dispatch to the processor upon indication that a task is "ready to run". Good design of the scheduling algorithm provides both effective use of central processing unit 20 by the various tasks and smooth response to user requests of data processing system 10. Within scheduler 50 is fast dispatch thread scheduler 52 which is invoked to preempt a currently executing thread on CPU 20 and to expedite dispatch if already meeting certain criteria. CPU 20 frequently, but briefly, halts execution of a current process to execute scheduler 50, as well as other components of the operating system kernel 12. Fast dispatch thread scheduler 52 is independent of and transparent to both to user and process.

Figure 2:
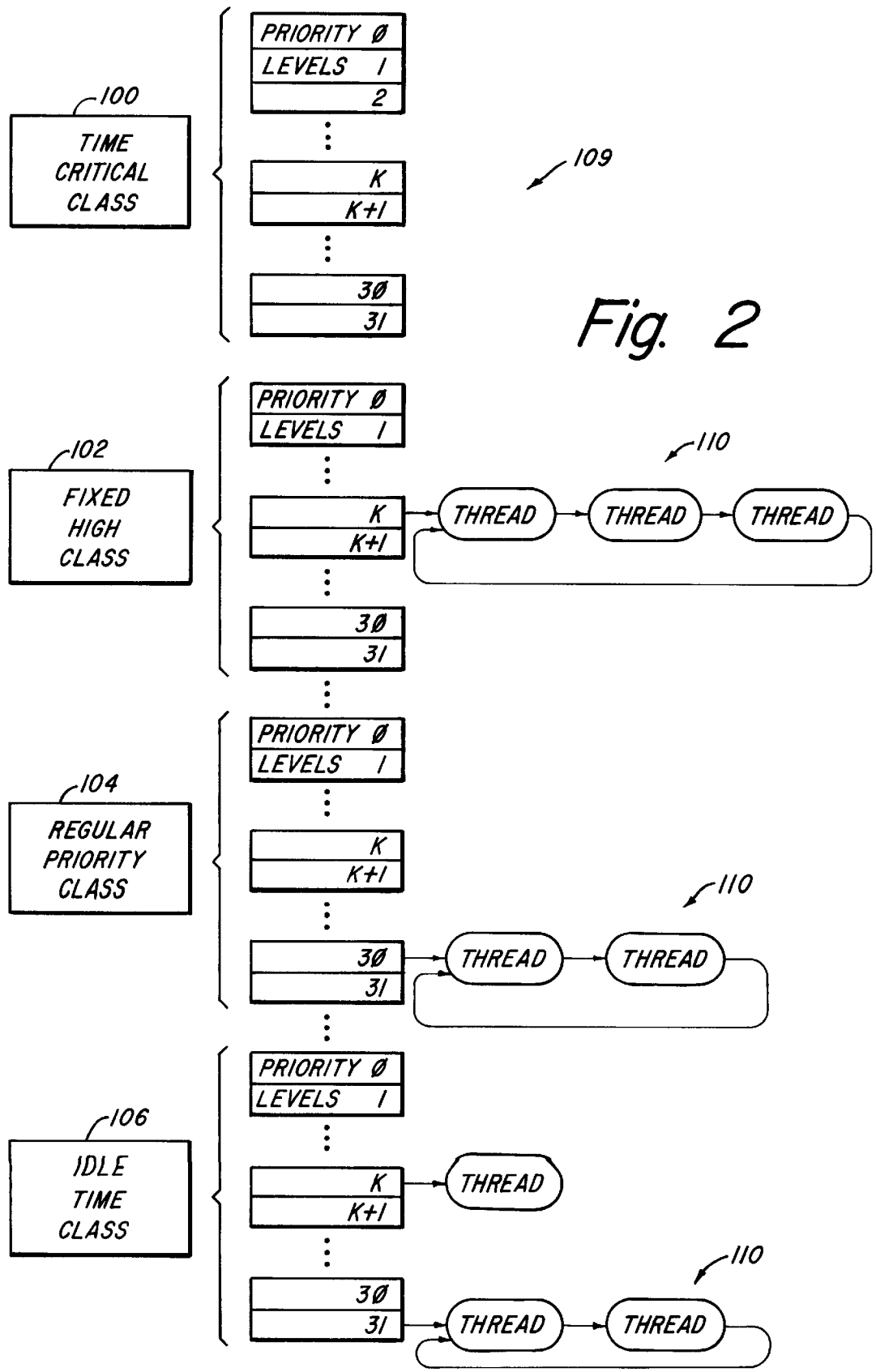
FIG. 2 is a graphical representation of a priority ordering for task scheduling utilized to implement the method and system of the present invention.

Operating system kernel 12 utilizes a round-robin scheduling algorithm graphically depicted in FIG. 2. Scheduling is based upon a number of factors, including priority category, priority level within a category, and when indication of readiness to run was first noted by the scheduler. When a process becomes ready to run a process control block which represents the process in the operating system is updated to indicate a change in status.

Round-robin scheduling is specifically designed for time sharing systems. Processor time and other resource allocations are sequentially dedicated to each task admitted to a ready to run queue 109. Each task at a given priority level initially has equal claim to processor time. Within the IBM OS/2 disk operating system, processes are not per se executed, rather processes include one or more threads, which are the schedulable unit. In an algorithm suitable for use with the present invention, 128 priority levels are defined, 32 of which (ranked from the lowest priority "0" to highest priority "31") are associated with four priority classes 100, 102, 104 and 106. The priority classes are from highest to lowest, time-critical, server, regular and idle-time. In a typical personal computer system utilizing a graphic user interface (e.g. Windows), the highest priority level 100 includes threads relating to control of the video output interface to a user, i.e. control of image displayed on a monitor, and threads relating to communications with other computers. The next highest priority level 102 may include threads relating to the application programs currently utilized by the user if boosted. The lowest priority category 106 may include threads relating to housekeeping on the computer.

If a plurality of threads, each thread at one priority level 110, receives a quanta of time and if processing is not completed within that set period the thread is removed from the central processing unit 20 and returned to the bottom of the ready to run queue for that priority level 110. If a process voluntarily relinquishes the central processing unit 20 it indicates that the process has reached a state at which it is no longer ready to run and can be removed from the queue. Data processing system 10 operation remains at a given priority level as long as processes remain in the ready to run queue 109 for that level or until a process appears in the ready to run queue for a higher priority level (hence the system is priority preemptive).

Dispatch latency is the elapsed time between the moment that CPU 20 executes the last instruction for a thread to the moment it executes the first instruction for the next thread. Dispatch latency is the processing overhead associated with execution of scheduler 50. A conventional scheme of preemptive priority scheduling with round-robin time distribution for threads of equal priority requires a number of tasks of scheduler 50, including allocating processor 20 time based on the extensive set of priorities set forth above and timers for threads of equal priority. Scheduler 50 must also honor all system and pseudo-system requests, such as abort commands and context hooks.

In addition, operating system 12 may handle threads having critical sections (i.e. non-preemptable code sequences). operating system kernel 12 may not be preemptable and may not support thread activation via directly or indirectly connected interrupts. The operating system may support multiple modes of operation, such as a virtual mode, a real mode and a protect mode. A wide variety of programs should be supported including common desk top applications and time-critical multimedia applications, all concurrently. Finally, thread dispatch latency optimization is preferably transparent to the remainder of operating system 12 and to application programs.

Optimization of the latency dispatch period for threads meeting certain criteria is met by providing a fast dispatch thread scheduler 52 within scheduler 50. Fast dispatch thread scheduler 52 provides qualification and expedited handling of scheduling by bypassing portions of scheduler 50 operation. Fast dispatch thread scheduler 52 provides a code sequence minimizing state chain linking and unlinking, omitting setting of a timer for the qualified thread and is preferably implemented in assembly language. The timer operation constitutes a substantial portion of the overhead of scheduler 50. Scheduler 52 is written substantially in inline code and all internal structures are properly bounded for register type, i.e. double words are on double word boundaries and words are on word boundaries. Where strictly inline code is not possible, the overhead of jump instructions was minimized by arranging the instructions so that the more frequently used path falls through the jump.

Scheduler 50 may be entered in one of several contexts. For example, a time out may have occurred, which forces the current process to surrender the CPU if another thread of equal or higher priority is in the ready-to-run queue. A thread may have voluntarily relinquished the CPU, and thus no thread may be current. The system may be responding to an interrupt caused by a device, or a system service call may have been completed, such as a disk I/O (input/output) operation. Scheduler 52 must operate in any of these contexts.

Figure 3A:
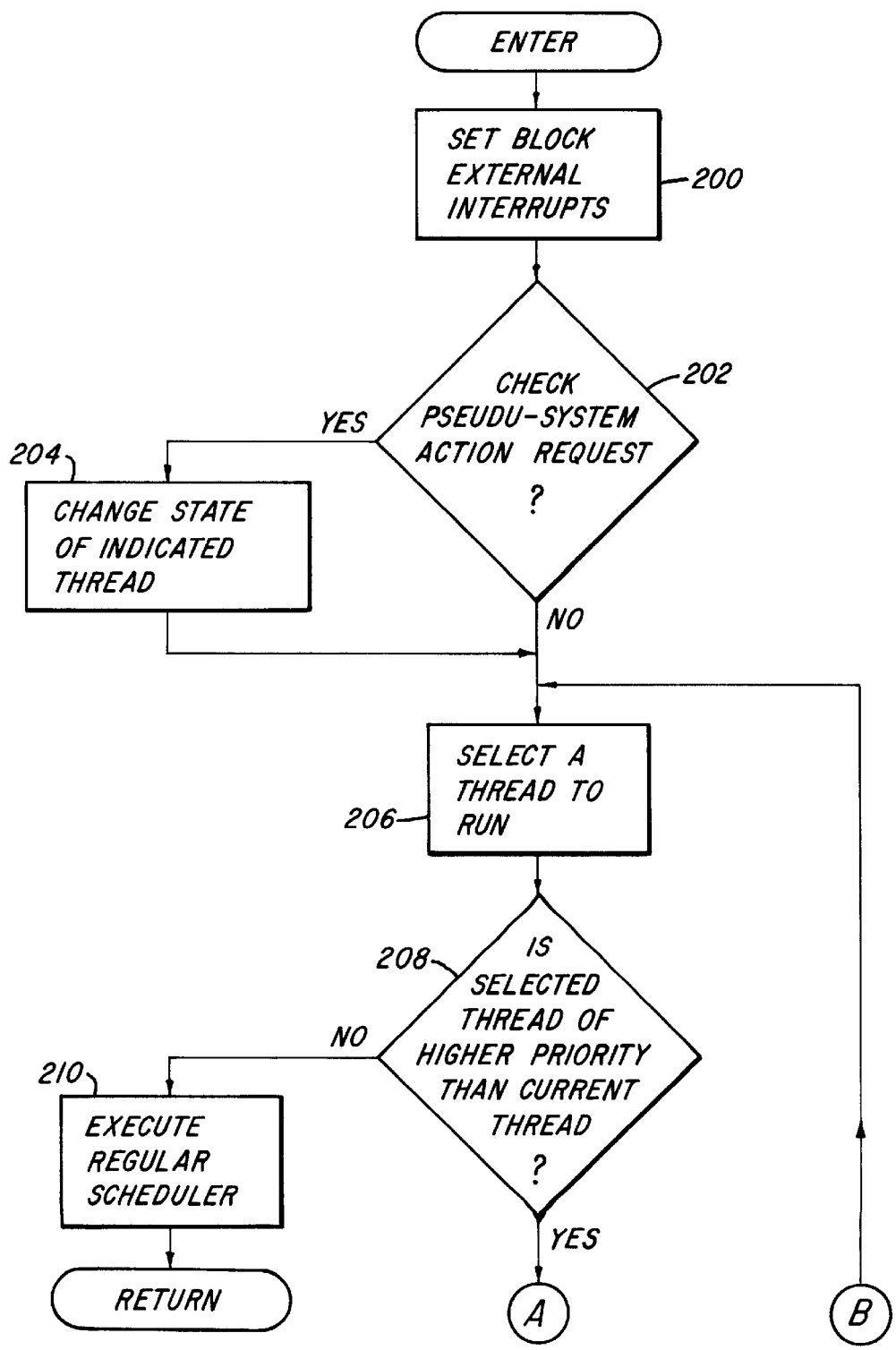
FIGS. 3a and 3b are a high level logical flow chart illustrating a program implementation of the dispatch thread scheduler.
Figure 3B:
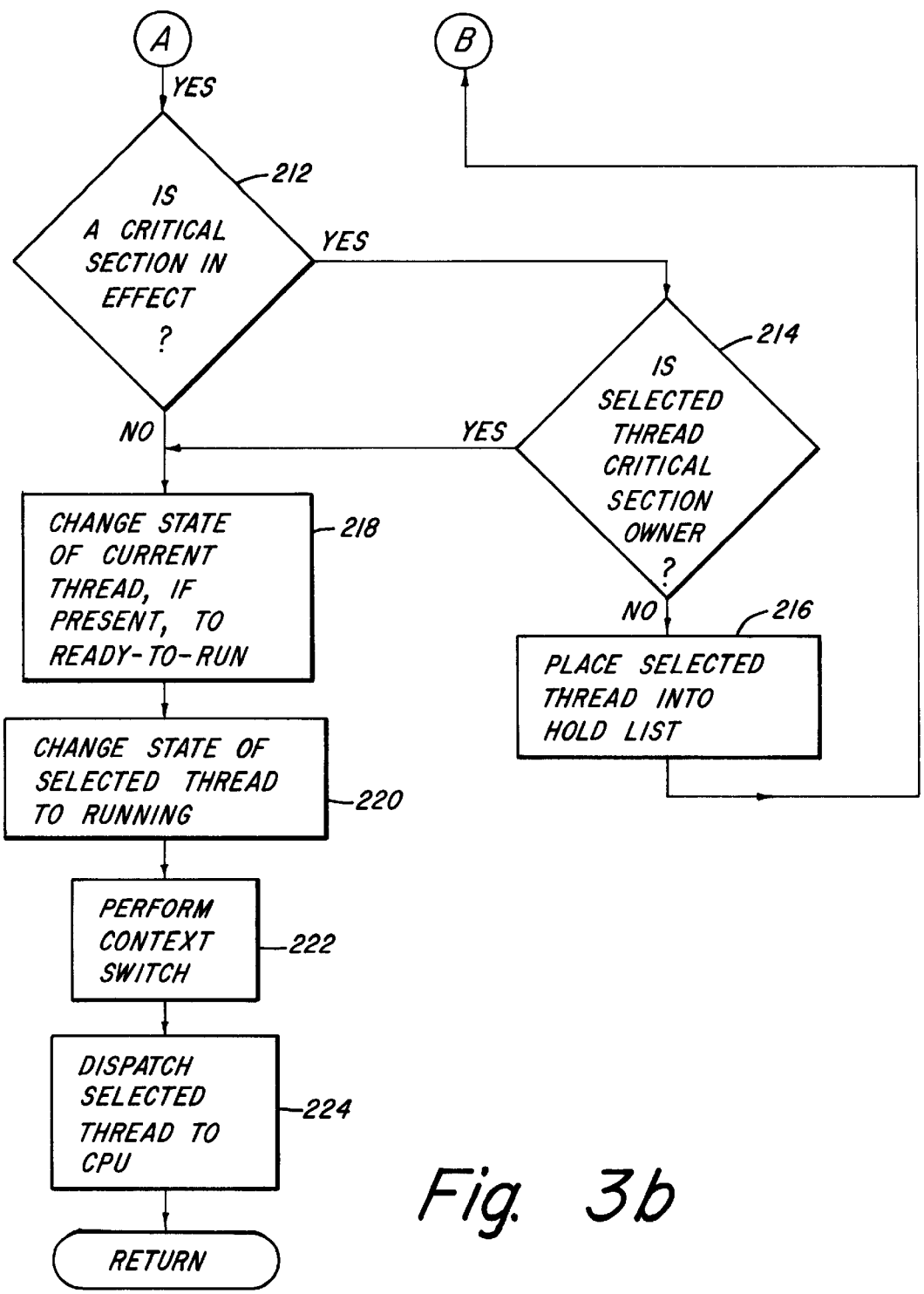

FIGS. 3a and 3b illustrate a high level logical flow chart of the process of fast dispatch thread scheduler 52. The process is entered at step 200 with setting a block of all external interrupts. Next, at step 202 it is determined if there are any pseudo-system action requests. If any pseudo-system action requests are present, the state of the indicated thread is changed from blocked (or new) to ready-to-run by execution of step 204.

Next, step 206 is executed to select the thread having the highest priority from the ready to run queue. At step 208 the process determines if the selected thread is of a higher priority than a thread which currently owns the processor, i.e. the thread having the "run" status. Along the No branch from step 208, indicating that the selected thread was of no more than equal priority to the current thread, processing is returned to scheduler 50, represented by box 210, indicating that the thread did not qualify for expedited handling. The YES branch indicates that a thread of higher priority has been selected, or that no thread is current.

Notwithstanding the fact that a thread has higher priority than another thread it might still be denied execution on CPU 20. This can occur when a critical section is in effect. The system allows each process to have one critical section, which may belong to any one thread of the process. In essence, critical sections are declared for certain threads because those threads modify sensitive data structures of importance to the overall process. Thus to maintain data structure integrity, execution of another thread from the process cannot be permitted. Steps 212 and 214 are utilized to identify presence of a critical section. At step 212 it is determined if a critical section is in effect. If not the process may continue with step 218. If YES, it must be determined if the selected thread owns the critical section (step 214). If the selected thread owns the critical section processing can continue with step 218. If another, lower priority thread of the selected thread's process owns the critical section, then the selected thread is placed into a hold list (step 216) until the critical section is lifted. The process is returned to step 206 for selection of another thread, preferably belonging to another process or for the process owning the critical section.

Steps 218–222 relate to preparation of the system for dispatch of the selected thread. At step 218 the state of the currently executing thread is changed to ready-to-run and the tread is returned to the ready-to-run queue. At step 220 the state of the selected thread is changed to the run state. At step 222 a context switch is performed. A context switch includes saving to memory the contents of registers of the CPU for the formerly current thread and the loading into the registers of the CPU appropriate data to run the selected process. At step 224 the selected process is dispatched to the CPU.

Fast dispatch thread scheduler 52 provides expedited scheduling of thread of higher priority than the normal scheduler for threads of equal priority under all circumstances. Expedited scheduling is independent and transparent to the operating system stemming from its installation in scheduler 50. Where multimedia applications are running, such expedited scheduling helps meet short duration requirements for dispatch of threads to maintain synchronization between data streams.

While the invention has been particularly shown and described with reference to a preferred embodiment, it will be understood by those skilled in the art that various changes in form and detail may be made therein without departing from the spirit and scope of the invention.

What is claimed is:

1. A method of enhancing task scheduling efficiency in a data processing system having a processor, a memory, and a multitasking operating system for managing the processor and the memory, the method comprising the data processing system implemented steps of:

providing both a first expedited task scheduling path for tasks and a second task scheduling path for tasks in a scheduler within said multitasking operating system, said first expedited task scheduling path implemented in assembly language and having a code sequence for minimizing state chain linking and unlinking and said second task scheduling path including a timer set to terminate a task upon elapse thereof;

assigning an execution priority to each of a plurality of tasks within said data processing system for execution on the processor;

periodically placing selected tasks in a ready-to-run queue within said data processing system;

periodically selecting a task holding a highest execution priority from among said selected tasks in the ready-to-run queue;

determining if a task is executing on the processor;

if a task is executing on the processor, comparing the execution priority of the selected task to the execution priority of the executing task;

responsive to the selected task holding a higher execution priority or to absence of an executing task, processing the selected task for execution on the processor along said first expedited scheduling path; and processing the selected task for execution on the processor along said second scheduling path responsive to the presence of an executing task holding an execution priority higher than the selected task.

2. A method of enhancing task scheduling efficiency in a data processing system as set forth in claim 1, wherein the step of processing the selected task for execution on the processor along said first expedited scheduling path comprises the steps of:

responsive to presence of an executing task on the processor, placing the executing task within the ready-to-run queue in an optimized manner;

performing a context switch on the processor; and dispatching the selected task to the processor.

3. A method of task scheduling efficiency in a data processing system as set forth in claim 2, wherein the selected task inherits a timer previously generated for the formerly executing task.

4. A method of enhancing task scheduling efficiency in a data processing system as set forth in claim 1, the method further comprising the steps of:

prior to processing the selected task for execution on the processor along said first expedited scheduling path;

determining if a critical section is in effect for a task from the same process as the selected task;

responsive to an affirmative determination, further determining if the selected task owns the critical section; and responsive to a negative determination of ownership, placing the selected task into a hold list and returning to the periodic selection step of claim 1.

5. A method of enhancing task scheduling efficiency in a data processing system as set forth in claim 4, the method further comprising the steps of:

prior to selecting a task holding a highest execution priority from among said selected task in the ready-to-run queue;

blocking all external interrupts; and responsive to presence of a pseudo-system action request, placing a task into the ready-to-run queue.

6. A data processing system comprising:

a processor;

a memory;

a multitasking operating system within said data processing system for managing the processor and the memory;

a scheduler in the multitasking operating system having a first expedited scheduling path for tasks within said data processing system and a second scheduling path for tasks within said data processing system, said first expedited task scheduling path implemented in assembly language and having a code sequence for minimizing state chain linking and unlinking and said second task scheduling path including a timer set to terminate a task upon elapse thereof;

means for assigning an execution priority to each of a plurality of tasks within said data processing system for execution on the processor;

means for periodically placing selected tasks in a ready-to-run queue within said data processing system;

means for periodically selecting a task holding a highest execution priority from among said selected tasks in the ready-to-run queue;

means for determining if a task is executing on the processor;

means responsive to execution of a task on the processor for comparing the execution priority of the selected job to the execution priority of the executing task;

means responsive to the selected task holding a higher execution priority than the executing job or to absence of an executing task on the processor for processing the selected task for execution on the processor along said first expedited scheduling path; and means processing the selected task for execution on the processor along said second scheduling path responsive to the presence of an executing task holding an execution priority higher than the selected task.

7. A data processing system as set forth in claim 6, wherein said means for processing the selected task for execution on the processor along said first expedited scheduling path comprises:

means responsive to presence of an executing task on the processor for placing the executing task within the ready-to-run queue in an optimized manner;

means for performing a context switch on the processor; and means for dispatching the selected task to the processor.

8. A data processing system as set forth in claim 7, wherein the selected task inherits a timer previously generated for the formerly executing task.

* * * * *